United States Patent
Jang et al.

(10) Patent No.: US 10,399,795 B1
(45) Date of Patent: Sep. 3, 2019

(54) TRANSFER APPARATUS USING STAR WHEEL

(71) Applicant: YKMC, Inc., Asan-si, Chungcheongnam-do (KR)

(72) Inventors: Kwan Seop Jang, Pyeongtaek-si (KR); Gi Bum Jang, Pyeongtaek-si (KR)

(73) Assignee: YKMC, INC., Asan-si, Chungcheongnam-do (KR)

( * ) Notice: Subject to any disclaimer, the term of this patent is extended or adjusted under 35 U.S.C. 154(b) by 0 days.

(21) Appl. No.: 16/362,508

(22) Filed: Mar. 22, 2019

(51) Int. Cl.
*B65G 47/84* (2006.01)

(52) U.S. Cl.
CPC .... *B65G 47/846* (2013.01); *B65G 2201/0244* (2013.01)

(58) Field of Classification Search
CPC ............................. B65G 47/284; B65G 47/84
USPC ............................................... 198/450, 478.1
See application file for complete search history.

(56) References Cited

U.S. PATENT DOCUMENTS

| | | | | |
|---|---|---|---|---|
| 4,150,520 A | * | 4/1979 | Palmieri | B65B 25/005 |
| | | | | 198/450 |
| 4,290,518 A | * | 9/1981 | Dyett | A24C 5/478 |
| | | | | 198/450 |
| 4,630,724 A | * | 12/1986 | Horie | A24C 5/336 |
| | | | | 131/282 |
| 5,531,312 A | * | 7/1996 | Dickey | B65G 47/1485 |
| | | | | 198/450 |
| 5,908,030 A | * | 6/1999 | Coi | A24C 5/326 |
| | | | | 131/84.1 |
| 6,520,316 B2 | * | 2/2003 | De Guglielmo | B65B 21/06 |
| | | | | 198/419.2 |
| 6,591,886 B1 | * | 7/2003 | Gonzalo | B65C 9/02 |
| | | | | 156/556 |
| 7,200,975 B2 | * | 4/2007 | Till | B65G 47/846 |
| | | | | 198/441 |
| 7,530,444 B2 | * | 5/2009 | Draghetti | B65G 29/00 |
| | | | | 198/474.1 |
| 7,849,998 B2 | * | 12/2010 | Langlois | B29C 49/421 |
| | | | | 198/470.1 |
| 8,230,893 B2 | * | 7/2012 | Zacche' | B65C 9/04 |
| | | | | 156/447 |
| 9,181,042 B2 | * | 11/2015 | Fahldieck | B65G 47/846 |
| 9,181,043 B1 | * | 11/2015 | Goudy | B65G 29/00 |
| 9,708,133 B2 | * | 7/2017 | Ballarotti | B65G 47/71 |

FOREIGN PATENT DOCUMENTS

KR 20-0449606 Y1 7/2010

\* cited by examiner

*Primary Examiner* — Douglas A Hess
(74) *Attorney, Agent, or Firm* — Rabin & Berdo, P.C.

(57) ABSTRACT

Provided is a transfer apparatus using a star wheel. The transfer apparatus using a star wheel includes a rotating body axially rotated by a rotating motor, a rotating column connected to the rotating body to axially rotate on a base, a star wheel which is connected to the rotating column to axially rotate and in which a plurality of rotating protrusion are spaced apart from each other at predetermined intervals along an entire circumferential surface in a circumferential direction to form transfer grooves and a connecting unit which connects the rotating body and the rotating column, and the rotating column of the rotating body is simply connected to the star wheel by an engagement structure including a protrusion and a recess.

2 Claims, 5 Drawing Sheets

TRANSFER APPARATUS USING STAR WHEEL

BACKGROUND

1. Field of the Invention

The present invention relates to a transfer apparatus using a star wheel, and more specifically, to a transfer apparatus using a star wheel for transferring a transfer-target object to a predetermined position by inserting the transfer-target object into transfer grooves between rotating protrusions of the star wheel.

2. Discussion of Related Art

Generally, a star wheel is a wheel configured to transfer transfer-target objects by inserting the transfer-target objects between rotating protrusions, which have a shape of a star and are continuously spaced apart from each other at predetermined intervals in a circumferential direction thereof, and is used for various fields such as curved transfer units of harvest agricultural machinery, paper transfer units of a printer, rotary packaging apparatuses, and the like.

As an example, a schematic structure of a star wheel according to the related art will be described below.

A star wheel according to the related art is a wheel typically applied to a rotary packaging apparatus for packaging a container having a bottle form and includes a rotating shaft configured to axially rotate on a base of a worktable, a wheel body including a coupling hole passing through a center of the wheel body provided to be fit and coupled to the rotating shaft, a plurality of rotating protrusions spaced apart from each other at equal intervals provided on an entire circumference of the wheel body, and transfer grooves which are formed between the rotating protrusions and into which transfer-target objects are inserted, and transfer groove depth adjusting holes which are each formed in a corresponding transfer groove of the wheel body to adjust a depth of the transfer groove so that the depths of the transfer grooves are adjustable.

However, since the star wheel of the related art is formed through a method in which the wheel body is fixedly coupled to the base through separate connecting holes in a state in which the coupling holes of the wheel body pass through an outer circumference of the rotating shaft, there are problems in that a coupling process of the star wheel is cumbersome, it takes a long time to couple or disassemble, and the like.

In addition, since a power transmission unit configured to axially rotate both of the star wheel and the rotating shaft is disposed to be hidden under the worktable, there are problems that it is difficult to manage, check, repair, and the like.
[Related Art Document]
[Patent Document]

(Patent Document 1) Korean Utility Model Registration No. 20-0449606

SUMMARY OF THE INVENTION

The present invention is directed to providing a transfer apparatus using a star wheel which includes a rotating body axially rotated by a rotating motor, a rotating column connected to the rotating body to axially rotate on a base, a star wheel which is connected to the rotating column to axially rotate and in which a plurality of rotating protrusions are provided to form transfer grooves formed to be spaced apart from each other at predetermined intervals along an entire circumferential surface in a circumferential direction, and a connecting unit which connects the rotating body and the rotating column so that the rotating body, the rotating column, and the star wheel are simply connected by an engagement structure including protrusions and recesses.

In addition, the present invention is also directed to providing a transfer apparatus using a star wheel in which a power transmission unit configured to axially rotate both of a star wheel and a rotating column is exposed above a worktable such that general management checks, repairs, and the like of the transfer apparatus are easy.

According to an aspect of the present invention, there is provided a transfer apparatus using a star wheel including an upper rotating shaft including a rotating body axially rotated by a rotating motor; a lower rotating shaft in which a rotating column connected to the rotating body to axially rotate on a base is formed; a star wheel which is connected to the rotating column to axially rotate and in which a plurality of rotating protrusions are provided to be spaced apart from each other at predetermined intervals along an entire circumferential surface in a circumferential direction to form transfer grooves; and a connecting unit which connects the rotating body and the rotating column, wherein the rotating body of the upper rotating shaft is connected to the rotating column of the lower rotating shaft by an engagement structure including a protrusion and a recess, the rotating column of the lower rotating shaft is connected to the star wheel by an engagement structure including a protrusion and a recess, and an engagement structure of the rotating column of the lower rotating shaft and the star wheel includes a second recess provided to be concavely recessed in one side of the rotating column and a second protrusion provided to be inserted into and engaged with the second recess on one side of the star wheel corresponding to the one side of the rotating column.

In the transfer apparatus using a star wheel according to the present invention, the engagement structure of the rotating body of the upper rotating shafts and the rotating column may include a first recess provided to be concavely recessed at a lower surface of the rotating body and include a first protrusion provided to be inserted into and engaged with the first recess at an upper surface of the rotating column corresponding to the lower surface of the rotating body; the first recess may have a structure of a long concave groove which extends from a center point of the rotating body in a radial direction; and the first protrusion corresponding to the first recess may have a structure of a long block protrusion which extends from a center point of the rotating column in a radial direction and may be collinear with the first recess; the rotating body of the upper rotating shaft may be connected by a belt to receive a rotating force of a motor rotating shaft of the rotating motor; a cover which covers all of the motor rotating shaft, the rotating body, and the belt may be provided; one end portion of the cover may be hinge-connected to the rotating motor; and the other end portion thereof which covers the rotating body may be vertically hinge-rotated by a predetermined angle.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, the present invention will be described with reference to the accompanying drawings.

Figure 1:
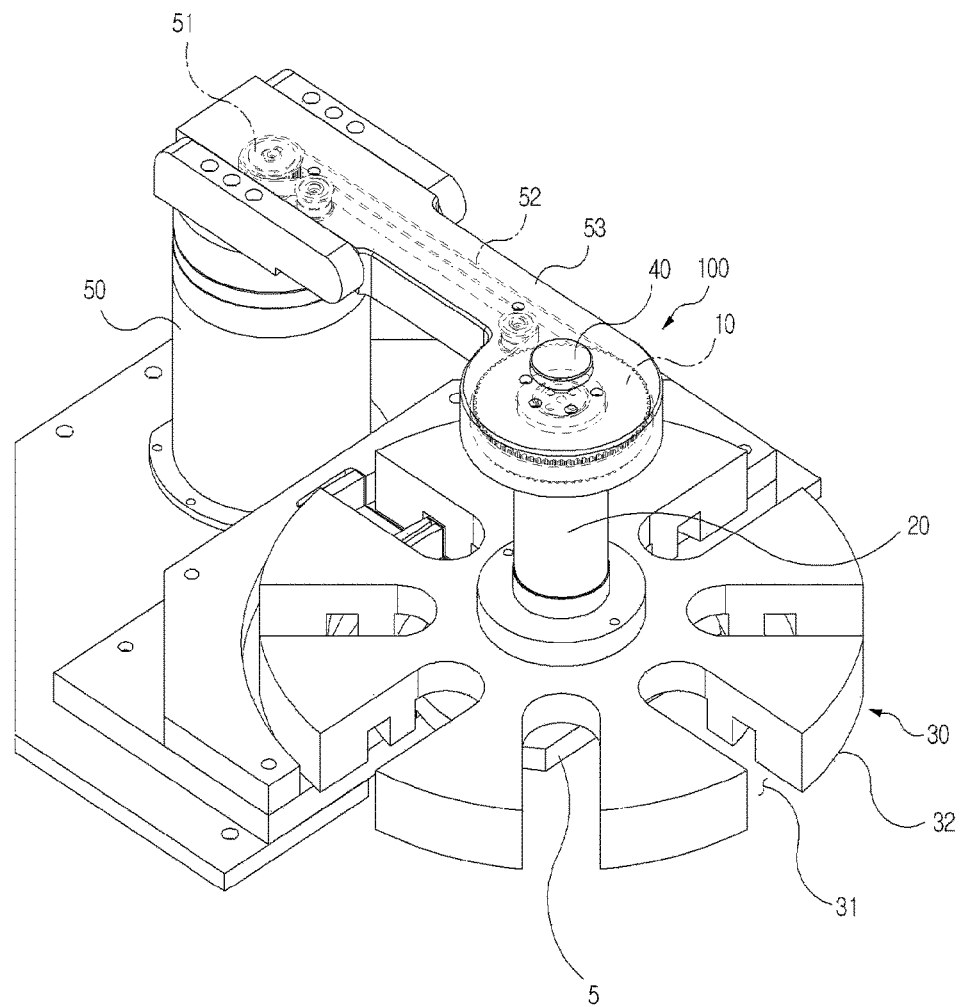
FIG. 1 is a perspective view illustrating a main portion of a transfer apparatus using a star wheel according to one embodiment of the present invention.
Figure 2:
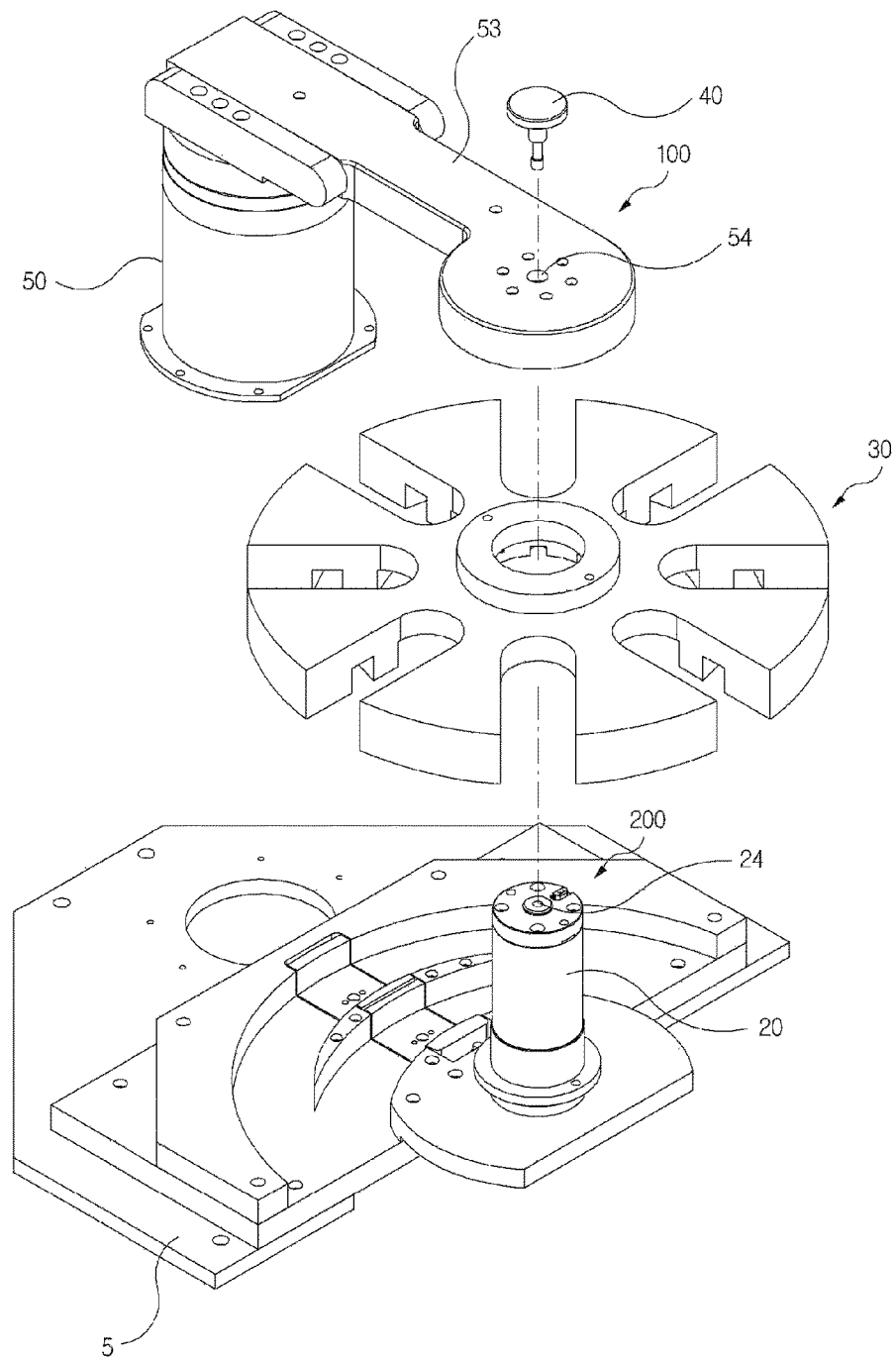
FIG. 2 is an exploded perspective view illustrating the main portion of the transfer apparatus using a star wheel according to one embodiment of the present invention.
Figure 3:
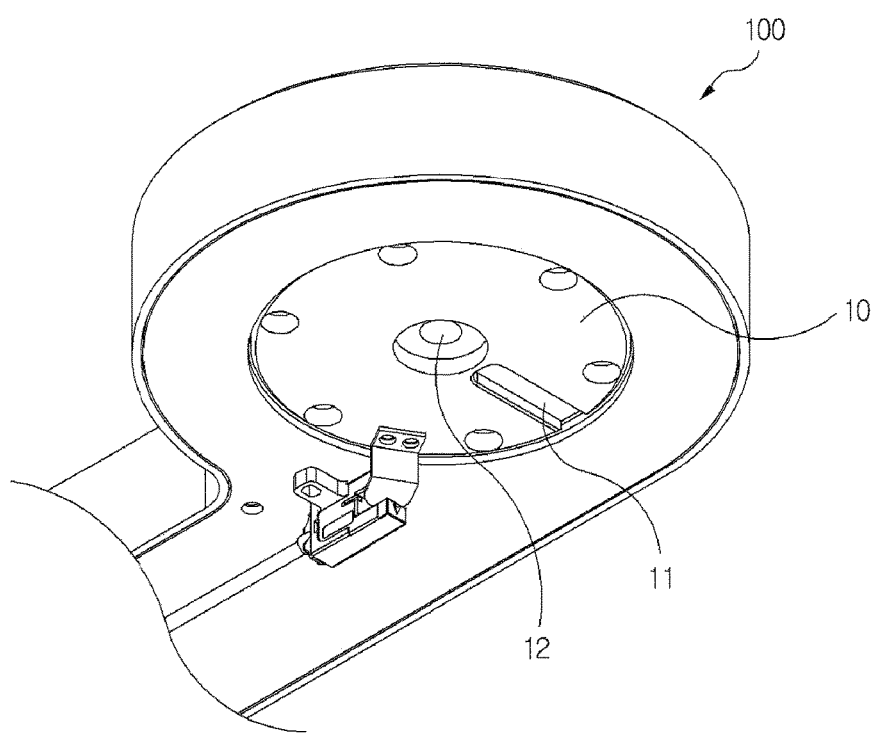
FIG. 3 is a bottom perspective view illustrating a main portion of a rotating body of the transfer apparatus using a star wheel according to one embodiment of the present invention.
Figure 4:
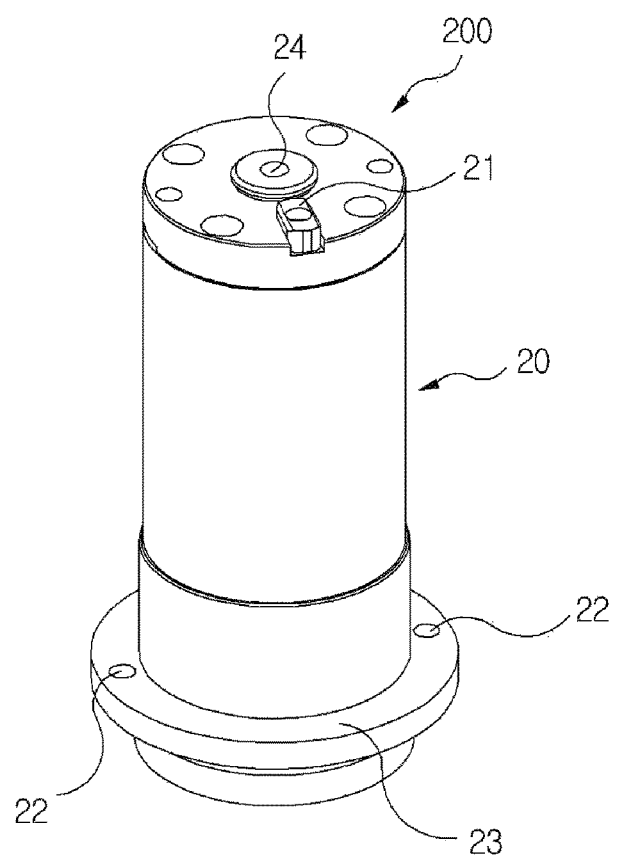
FIG. 4 is a perspective view illustrating a main portion of a rotating column of the transfer apparatus using a star wheel according to one embodiment of the present invention.
Figure 5:
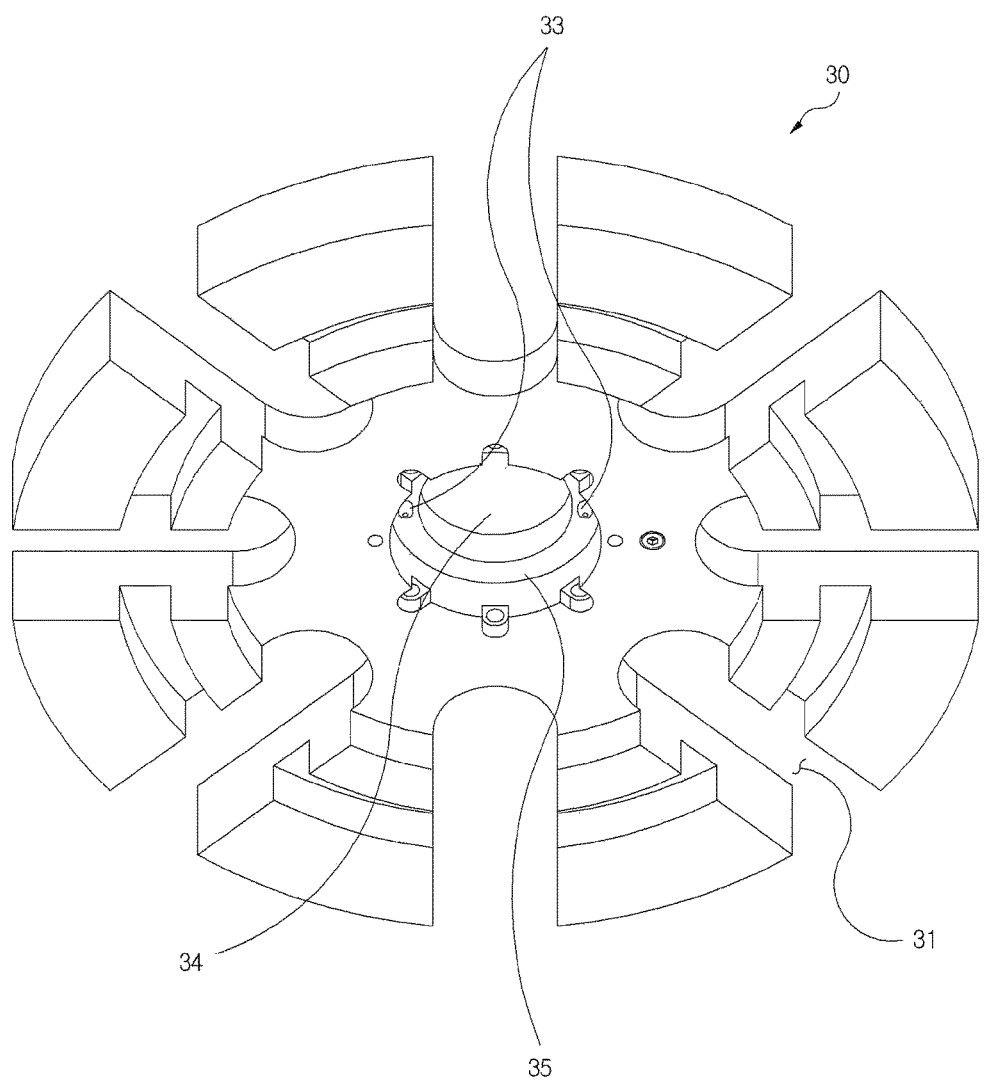
FIG. 5 is a bottom perspective view illustrating a main portion of a star wheel of the transfer apparatus using a star wheel according to one embodiment of the present invention.

As illustrated in FIGS. 1 to 5, a transfer apparatus using a star wheel according to one embodiment of the present invention includes an upper rotating shaft 100 in which a rotating body 10 is formed, a lower rotating shaft 200 in which a rotating column 20 is formed, a star wheel 30, and a connecting unit 40 and has a structure in which the rotating body 10, the rotating column 20, and the star wheel 30 are connected by an engagement structure including protrusions and recesses.

The rotating body 10 of the upper rotating shaft 100 has a structure of a circular plate axially rotated by the rotating motor 50, and a first recess 11, which is long and concavely recessed, is provided in a lower surface of the rotating body 10 such that a first protrusion 21 formed on an upper surface of the rotating column 20 is inserted into and engaged with the first recess 11.

In addition, the rotating body 10 is connected to a motor rotating shaft 51 of the rotating motor 50 by a separate belt (or chain or the like) 52 to receive a rotating force of the rotating motor 50, a cover 53 is provided to cover all of the motor rotating shaft 51, the rotating body 10, and the belt 52, and the cover 53 has a structure in which one end portion thereof is hinge-connected to the rotating motor 50, and the other end portion thereof which covers the rotating body 10 is vertically hinge-rotated by a predetermined angle.

That is, when the first recess 11 of the rotating body 10 is coupled to the first protrusion 21 of the rotating column 20, a front end of the cover 53 is hinge-rotated upward by a predetermined height, the first recess 11 and the first protrusion 21 are positioned to be collinear therewith, and a front end portion of the cover 53 is moved downward such that the first recess 11 is engaged with the first protrusion 21.

In addition, in a case in which the engagement of the first recess 11 and the first protrusion 21 has to be released, the front end portion of the cover 53 may be moved upward to release the engagement thereof.

Here, a known technology in which a separate bearing is interposed between the rotating body 10 and the cover 53 and the rotating body 10 receives a rotating force of the belt 52 to axially and relatively rotate with respect to the cover 53 may be applied to the present invention.

Meanwhile, the front end portion of the cover 53 is vertically hinge-rotatable to a predetermined height and a rear end portion of the cover 53 is also horizontally axially rotatable about the motor rotating shaft 51.

The rotating column 20 of the lower rotating shaft 200 has a cylindrical shape connected to the rotating body 10 to axially rotate on the base 5.

In addition, the first protrusion 21, which has a structure of a long block protrusion which extends from a center point of the rotating column 20 in a radial direction and is disposed to be vertically collinear with the first recess 11, is disposed at one side of the upper surface of the rotating column 20 to correspond to the first recess 11, and a second recess 22 concavely recessed on an upper surface of the flange 23 having a shape of a circular ring which radially extends is formed in a lower end portion of the rotating column 20.

The star wheel 30 has a shape of a circular plate which is connected to the rotating column 20 and is axially rotated and in which a plurality of rotating protrusions 32 are spaced apart from each other at predetermined intervals along an entire circumferential surface in a circumferential direction such that transfer grooves 31 are formed.

In addition, second protrusions 33 which are inserted into and engaged with second recesses 22 concavely recessed at one side of the rotating column 20 are formed at one side of the star wheel 30.

More specifically, the second protrusions 33 of the star wheel 30 protrude downward from a lower surface of an edge of a through hole 34 disposed at a center of the star wheel 30 and are inserted into and engaged with the second recesses 22 concavely recessed from the upper surface of the flange 23 having the shape of the circular ring which extends from the lower end portion of the rotating column 20 in the radial direction.

In addition, an accommodation groove 35 which is concavely recessed is provided in the star wheel 30 such that the flange 23 is covered and accommodated inside a lower surface of the star wheel 30 and the flange 23 is firmly coupled to the star wheel 30 in a state in which the second recesses 22 are engaged with the second protrusions 33.

The connecting unit 40 is a kind of a coupling unit to connect the rotating body 10 and the rotating column 20, and a connecting structure of the rotating body 10 and the rotating column 20 using the connecting unit 40 is formed such that through holes 12 and 54 are formed in a center portion of the rotating body 10 and the cover 53, which is collinear with the center portion of the rotating body 10, and a connecting groove 24 concavely recessed is formed at a center of the upper surface of the rotating column 20 to connect the rotating body 10 and the rotating column 20 by the connecting unit 40 passing through the through holes 12 and 54 to be coupled to the connecting groove 24 disposed under the through holes 12 and 54.

An assembly process of the transfer apparatus using a star wheel will be described below.

First, the rotating column 20 passes through the through hole 34 of the star wheel 30 to move the star wheel 30 downward and install the star wheel 30 around the rotating column 20.

Next, when the star wheel 30 is axially rotated in a state in which the rotating column 20 is fixed, the second protrusions 33 of the star wheel 30 are inserted into the second recesses 22 of the rotating column 20, and the star wheel 30 and the rotating column 20 are engaged while the star wheel 30 is axially rotated.

In this state, after the rotating column 20 is axially rotated in a state in which the front end portion of the cover 53 is moved upward, the cover 53 is moved downward toward an upper portion of the rotating column 20 such that the lower surface of the rotating body 10 comes into contact with the upper surface of the rotating column 20.

Next, when the rotating column 20 is axially rotated, the first protrusion 21 of the rotating column 20 is inserted into and engaged with the first recess 11 of the rotating body 10 at a predetermined position.

Next, the rotating body 10, the rotating column 20, and the star wheel 30 which are formed on the upper and lower rotating shafts 100 and 200 of the present invention are completely connected by the connecting unit 40 passing through the through holes 12 and 54 of the rotating body 10 and the cover 53, which are collinear therewith, to be coupled to the connecting groove 24.

In a state in which the rotating body 10, the rotating column 20, and the star wheel 30 are completely connected, when the rotating motor 50 is operated, a rotating force of the rotating motor 50 is transmitted to the rotating body 10 by the belt 52, accordingly, the rotating column 20 engaged with the rotating body 10 is axially rotated, and transfer-target objects inserted into the transfer grooves 31 may be transferred to predetermined positions while the star wheel 30 engaged with the rotating column 20 is continuously axially rotated.

Meanwhile, when the apparatus has to be disassembled in a case in which the apparatus has an abnormality, in a reverse order of the assembly, first, the connecting unit 40 is disassembled therefrom, the front end portion of the cover 53 is moved upward to disassemble the rotating body 10 from the rotating column 20, the cover 53 is horizontally and axially rotated to be spaced apart from the rotating body 10, and the star wheel 30 is moved upward such that the star wheel 30 is decoupled from the rotating column 20.

Then, the abnormality of the apparatus may be quickly and simply checked in a state in which all the components are disassembled.

As described above, since the transfer apparatus using a star wheel according to one embodiment of the present invention includes the upper rotating shaft in which the rotating body axially rotated by the rotating motor is formed, the lower rotating shaft in which the rotating column connected to the rotating body and axially rotated on the base is formed, the star wheel which is connected to the rotating column to axially rotate and in which the plurality of rotating protrusions are provided to be spaced apart from each other at predetermined intervals along the entire circumferential surface in the circumferential direction to form the transfer grooves, and the connecting unit which connects the rotating body and the rotating column, and the rotating body, the rotating column, and the star wheel are simply connected by the engagement structure including the protrusions and the recesses, a connection process for the components are quickly and simply performed, and thus, the workability thereof can be improved.

In addition, since the power transmission unit configured to axially rotate both of the star wheel and the rotating column is exposed above the worktable such that general management checks, repairs, and the like of the transfer apparatus are easy, when problems of the apparatus occur, treatments can be quickly performed, and thus, the general operational efficiency can be improved.

As described above, since a transfer apparatus using a star wheel according to one embodiment of the present invention includes an upper rotating shaft in which a rotating body axially rotated by a rotating motor is formed, a lower rotating shaft in which a rotating column connected to the rotating body and axially rotated on a base is formed, a star wheel which is connected to the rotating column to axially rotate and in which a plurality of rotating protrusions are provided to be spaced apart from each other at predetermined intervals along an entire circumferential surface in a circumferential direction to form transfer grooves, and a connecting unit which connects the rotating body and the rotating column, and the rotating body, the rotating column, and the star wheel are simply connected by an engagement structure including protrusions and recesses, there are effects that a connection process for the components are quickly and simply performed, and thus, the workability thereof can be improved.

In addition, since the power transmission unit configured to axially rotate both of the star wheel and the rotating column is exposed above the worktable such that general management checks, repairs, and the like of the transfer apparatus are easy, there are effects that treatments can be quickly performed when problems of the apparatus occur, and thus, the general operational efficiency can be improved.

While the present invention has been described with reference to the exemplary embodiments as described above, modified embodiments in which the exemplary embodiments are simply combined with or applied to a known related art and any technology which may be easily modified from the claims and the detailed description of the present invention and used by the skilled in the art fall within the technical scope of the present invention.

What is claimed is:

1. A transfer apparatus using a star wheel, comprising:
an upper rotating shaft including a rotating body axially rotated by a rotating motor;
a lower rotating shaft in which a rotating column connected to the rotating body to axially rotate on a base is formed;
a star wheel which is connected to the rotating column to axially rotate and in which a plurality of rotating protrusions are provided to be spaced apart from each other at predetermined intervals along an entire circumferential surface in a circumferential direction to form transfer grooves; and
a connecting unit which connects the rotating body and the rotating column,
wherein the rotating body of the upper rotating shaft is connected to the rotating column of the lower rotating shaft by an engagement structure including a protrusion and a recess, the rotating column of the lower rotating shaft is connected to the star wheel by an engagement structure including a protrusion and a recess, a second recess, which is concavely recessed, is provided in one side of the rotating column, a second protrusion, which is inserted into and engaged with the second recess, is provided on one side of the star wheel corresponding to the one side of the rotating column so that the rotating column of the lower rotating shaft is fixedly engaged with the star wheel, a first recess which is concavely recessed is provided in a lower surface of the rotating body and a first protrusion which is inserted into and engaged with the first recess is provided on an upper surface of the rotating column corresponding to the lower surface of the rotating body so that the rotating body of the upper rotating shafts is fixedly engaged with the rotating column, the first recess has a structure of a long concave groove which extends from a center point of the rotating body in a radial direction, and the first protrusion has a structure of a long block protrusion which extends from a center point of the rotating column in a radial direction and is collinear with the first recess.

2. The transfer apparatus of claim 1, wherein:

the rotating body of the upper rotating shaft is connected by a belt to receive a rotating force of a motor rotating shaft of the rotating motor;

a cover, which covers all of the motor rotating shaft, the rotating body, and the belt, is provided;

one end portion of the cover is hinge-coupled to the rotating motor; and the other end portion of the cover which covers the rotating body is vertically hinge-rotated by a predetermined angle.

* * * * *